(12) United States Patent
Yamada et al.

(10) Patent No.: US 12,206,137 B2
(45) Date of Patent: Jan. 21, 2025

(54) BATTERY AND MANUFACTURING METHOD THEREFOR

(71) Applicant: Prime Planet Energy & Solutions, Inc., Tokyo (JP)

(72) Inventors: Tomoyuki Yamada, Kobe (JP); Takashi Hosokawa, Hyogo-ken (JP); Ryoichi Wakimoto, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 17/519,262

(22) Filed: Nov. 4, 2021

(65) Prior Publication Data

US 2022/0140453 A1 May 5, 2022

(30) Foreign Application Priority Data

Nov. 5, 2020 (JP) ................................. 2020-185189

(51) Int. Cl.
*H01M 50/538* (2021.01)
*H01M 10/04* (2006.01)
(Continued)

(52) U.S. Cl.
CPC ..... *H01M 50/538* (2021.01); *H01M 10/0431* (2013.01); *H01M 50/186* (2021.01); *H01M 50/446* (2021.01); *H01M 50/547* (2021.01)

(58) Field of Classification Search
CPC ............ H01M 50/538; H01M 50/186; H01M 50/547; H01M 50/446; H01M 10/0431
(Continued)

(56) References Cited

U.S. PATENT DOCUMENTS

| 10,224,564 B2 * | 3/2019 | Umeyama ............. H01M 4/505 |
| 2010/0285341 A1 | 11/2010 | Yun et al. |

(Continued)

FOREIGN PATENT DOCUMENTS

| CN | 101821877 A | 9/2010 |
| CN | 102386435 A | 3/2012 |

(Continued)

OTHER PUBLICATIONS

Enomoto machine translation (Year: 2017).*
DE-102016111020-A1 (translation) (Year: 2016).*
KR-1415575-B1 (machine translation) (Year: 2014).*

*Primary Examiner* — Matthew T Martin
*Assistant Examiner* — Paul Christian St Wyrough
(74) *Attorney, Agent, or Firm* — HAUPTMAN HAM, LLP

(57) ABSTRACT

Disclosed here is a battery including: an exterior body having a bottom wall; and a winding electrode body in which positive electrode, negative electrode and separator are wound about a winding axis. The winding electrode body has a flat shape having a pair of curvature parts having a curved outside surface and a flat part that connects the pair of curvature parts to each other and has a flat outside surface. When a line perpendicular to the winding axis of the winding electrode body and perpendicular to the bottom wall of the exterior body is assumed as L1, a portion positioned at an outermost periphery of the negative electrode in at least one of the pair of the curvature parts faces a portion positioned on a winding inner peripheral side of the negative electrode via the separator and not via the positive electrode on the line L1.

14 Claims, 9 Drawing Sheets

(51) Int. Cl.
  *H01M 50/186*   (2021.01)
  *H01M 50/446*   (2021.01)
  *H01M 50/547*   (2021.01)

(58) Field of Classification Search
  USPC .......................................................... 429/163
  See application file for complete search history.

(56) References Cited

U.S. PATENT DOCUMENTS

| | | | |
|---|---|---|---|
| 2012/0052341 A1 | 3/2012 | Kim et al. | |
| 2015/0194655 A1* | 7/2015 | Toyoshima | H01M 4/485 |
| | | | 429/246 |
| 2016/0329595 A1 | 11/2016 | Kang et al. | |
| 2016/0380299 A1 | 12/2016 | Umeyama et al. | |
| 2018/0097207 A1 | 4/2018 | Unno et al. | |
| 2020/0194741 A1 | 6/2020 | Shinoda et al. | |
| 2020/0295339 A1 | 9/2020 | Kwak et al. | |

FOREIGN PATENT DOCUMENTS

| | | | | | |
|---|---|---|---|---|---|
| CN | 105874639 | A | | 8/2016 | |
| CN | 106299444 | A | | 1/2017 | |
| CN | 107534115 | A | | 1/2018 | |
| CN | 111095644 | A | | 5/2020 | |
| CN | 111682250 | A | | 9/2020 | |
| DE | 102016111020 | A1 | * | 12/2016 | ........ H01M 10/0431 |
| EP | 2426752 | A2 | * | 3/2012 | ........ H01M 10/0413 |
| EP | 3096386 | A1 | * | 11/2016 | ........ H01M 10/0413 |
| JP | 2012-230865 | A | | 11/2012 | |
| JP | 5100441 | B2 | | 12/2012 | |
| JP | 2017-10878 | A | | 1/2017 | |
| JP | 2017-50069 | A | | 3/2017 | |
| JP | 2017-120743 | A | | 7/2017 | |
| KR | 1415575 | B1 | * | 7/2014 | |
| KR | 1020160023096 | A | | 3/2016 | |
| WO | 2016/080177 | A1 | | 5/2016 | |
| WO | WO-2017148610 | A1 | * | 9/2017 | |
| WO | 2018/123088 | A1 | | 7/2018 | |

* cited by examiner

BATTERY AND MANUFACTURING METHOD THEREFOR

CROSS REFERENCE TO RELATED APPLICATIONS

The present application claims priority based on Japanese Patent Application No. 2020-185189 filed on Nov. 5, 2020, the entire contents of which are incorporated herein by reference.

BACKGROUND OF THE INVENTION

1. Field of the Invention

The present teaching relates to a battery and a manufacturing method therefor.

2. Description of the Related Art

Conventionally, a battery including a winding electrode body in which a strip-shaped positive electrode including a positive electrode active material layer on a positive electrode collector and a strip-shaped negative electrode including a negative electrode active material layer on a negative electrode collector are laminated with each other via a strip-shaped separator and wound about a winding axis has been known (see Japanese Patent Application Laid-open No. 2017-010878). For example, Japanese Patent No. 5100441 discloses a winding electrode body in which a plurality of tabs (lead withdrawing parts) that are a part of a positive electrode collector protrude from one end in a winding axis direction and a plurality of tabs that are a part of a negative electrode collector protrude from the other end. In the Patent Literature, the outside surface of the winding electrode body is covered with a separator. The plurality of tabs are bundled together as one and welded and joined to a lead for current collection.

SUMMARY

According to studies by the present inventors, a plurality of tabs have play so as to be movable in a direction crossing a direction protruding from a collector. Therefore, if vibration, shock, or the like is applied from an outside during the use of a battery or the like, a winding electrode body may contact a battery case or a component attached to the battery case. As a result, there is a possibility that a separator covering the outside surface of the winding electrode body is damaged and a positive electrode and a negative electrode are short-circuited to each other.

The present teaching has been made in view of the above circumstances and has an object of providing a battery that prevents the short circuit between a positive electrode and a negative electrode and improves reliability and a manufacturing method for the battery.

According to the present teaching, there is provided a battery including: an exterior body having a bottom wall, a pair of first side walls extending from the bottom wall and facing each other, a pair of second side walls extending from the bottom wall and facing each other, and an opening facing the bottom wall; a sealing plate that seals the opening of the exterior body; at least one winding electrode body in which a strip-shaped positive electrode and a strip-shaped negative electrode are laminated with each other via a strip-shaped separator and wound about a winding axis; a positive electrode tab group that includes a plurality of positive electrode tabs provided at an end in a winding axis direction of the winding electrode body and is electrically connected to the positive electrode; and a negative electrode tab group that includes a plurality of negative electrode tabs provided at an end in the winding axis direction of the winding electrode body and is electrically connected to the negative electrode. The winding electrode body has a flat shape having a pair of curvature parts having a curved outside surface and a flat part that connects the pair of curvature parts to each other and has a flat outside surface and is accommodated in the exterior body so that one of the curvature parts faces the sealing plate and the other thereof faces the bottom wall of the exterior body. Wherein, when a line perpendicular to the winding axis of the winding electrode body and perpendicular to the bottom wall is assumed as L1, a portion positioned at an outermost periphery of the negative electrode in at least one of the pair of the curvature parts faces a portion positioned on a winding inner peripheral side of the negative electrode via the separator and not via the positive electrode on the line L1.

The winding electrode body of the battery is accommodated in the exterior body so that the curvature parts face the bottom wall of the exterior body and/or the sealing plate, and the portion positioned at the outermost periphery of the negative electrode in the curvature parts facing the bottom wall of the exterior body and/or the sealing plate faces the portion positioned on the winding inner peripheral side not via the positive electrode on the line L1. Thus, even if the curvature parts contact the bottom wall and/or the sealing plate and components provided in the bottom wall and the sealing plate to cause damage on the separator, it is possible to prevent the short circuit between the portion positioned at the outermost periphery of the negative electrode and the positive electrode. Accordingly, it is possible to improve the reliability of the battery.

In a preferred mode of the battery disclosed here, the battery includes a spacer arranged between the sealing plate and the winding electrode body, and the portion positioned at the outermost periphery of the negative electrode faces the portion positioned on the winding inner peripheral side of the negative electrode via the separator and not via the positive electrode on the line L1. With such a configuration, the winding electrode body is not liable to move greatly toward the sealing plate. Therefore, it is possible to prevent damage on the separator caused when the winding electrode body contacts the sealing plate. Thus, it is possible to effectively prevent the short circuit between the positive electrode and the negative electrode. Further, it is possible to reduce loads on the positive electrode tab group and/or the negative electrode tab group and stably maintain electrical connection. Thus, it is possible to improve the conduction reliability of the battery.

In a preferred mode of the battery disclosed here, the battery includes: a terminal that is attached to the sealing plate and electrically connected to the positive electrode tab group or the negative electrode tab group; a collecting part that electrically connects the positive electrode tab group or the negative electrode tab group and the terminal to each other; and an insulating member that insulates the sealing plate and the collecting part from each other and has a protrusion part protruding to a side of the winding electrode body from a side of the sealing plate, and the protrusion part of the insulating member constitutes the spacer. With such a configuration, it is possible to relax stress applied to the curvature parts even if the curvature parts contact the bottom wall and/or the sealing plate. Thus, the separator is not liable to be damaged, which makes it possible to effectively prevent the short circuit between the positive electrode and the negative electrode.

In a preferred mode of the battery disclosed here, the spacer does not contact the winding electrode body. Thus, when the spacer is arranged at a position separated from the electrode body, it is possible to prevent the curvature parts and the spacer from rubbing against each other even if the winding electrode body moves toward the sealing plate. Thus, the separator is not liable to be damaged, which makes it possible to effectively prevent the short circuit between the positive electrode and the negative electrode.

In a preferred mode of the battery disclosed here, the at least one winding electrode body includes a plurality of winding electrode bodies. In a battery including a plurality of winding electrode bodies, it is especially demanded that the short circuit between a positive electrode and a negative electrode be prevented to increase reliability. Accordingly, the application of the technology disclosed here is particularly effective.

In a preferred mode of the battery disclosed here, the separator includes a resinous base material part and a heat resistance layer that is provided on the base material part and contains an inorganic filler, and the outside surface of the winding electrode body is covered with the heat resistance layer in at least one of the pair of curvature parts. With such a configuration, it is possible to relax stress applied to the curvature parts even if the curvature parts contact the bottom wall and/or the sealing plate. Thus, the separator is not liable to be damaged, which makes it possible to effectively prevent the short circuit between the positive electrode and the negative electrode.

Further, according to the present teaching, there is provided a manufacturing method for a battery including an exterior body having a bottom wall, a pair of first side walls extending from the bottom wall and facing each other, a pair of second side walls extending from the bottom wall and facing each other, and an opening facing the bottom wall, a sealing plate that seals the opening of the exterior body, at least one winding electrode body in which a strip-shaped positive electrode and a strip-shaped negative electrode are laminated with each other via a strip-shaped separator and wound about a winding axis, a positive electrode tab group that includes a plurality of positive electrode tabs provided at an end in a winding axis direction of the winding electrode body and is electrically connected to the positive electrode, a negative electrode tab group that includes a plurality of negative electrode tabs provided at an end in the winding axis direction of the winding electrode body and is electrically connected to the negative electrode, and a spacer arranged between the sealing plate and the winding electrode body, the winding electrode body having a flat shape having a pair of curvature parts having a curved outside surface and a flat part that connects the pair of curvature parts to each other and has a flat outside surface and being accommodated in the exterior body so that one of the curvature parts faces the sealing plate and the other thereof faces the bottom wall of the exterior body. The manufacturing method includes: an insertion step of thrusting the winding electrode body into the exterior body with the spacer; and a sealing step of sealing the opening of the exterior body with the sealing plate. In the insertion step, a portion positioned at an outermost periphery of the negative electrode in at least a part of a region pressed by the spacer in the winding electrode body faces a portion positioned on a winding inner peripheral side of the negative electrode via the separator and not via the positive electrode.

In the manufacturing method, the winding electrode body is thrusted into the exterior body when the curvature parts of the winding electrode body are pressed by the spacer. At this time, the portion positioned at the outermost periphery of the negative electrode is caused to face the portion positioned on the winding inner peripheral side of the negative electrode via the separator and not via the positive electrode, which makes it possible to prevent the short circuit between the portion positioned at the outermost periphery of the negative electrode and the positive electrode even if the curvature parts are strongly pressed by the spacer. Further, the winding electrode body is caused to contact the sealing plate or a component attached to the sealing plate by the spacer, which makes it possible to prevent damage on the separator. Accordingly, it is possible to stably insert the winding electrode body into the exterior body and manufacture the battery.

When a line perpendicular to the winding axis of the winding electrode body and perpendicular to the bottom wall is assumed as L1, at least an outside surface positioned on the line L1 in the winding electrode body is pressed in the insertion step. Thus, it is possible to stably insert the winding electrode body into the exterior body, while preventing damage on the separator.

In a preferred mode of the manufacturing method disclosed here, the spacer does not contact the winding electrode body after the sealing step. Thus, it is possible to prevent damage on the separator caused when the curvature parts and the spacer rub against each other even if the winding electrode body moves toward the sealing plate.

In a preferred mode of the manufacturing method disclosed here, a shortest distance between the winding electrode body and the spacer is 5 mm or less after the sealing step. Thus, it is possible to make the electrode body and the spacer contact each other more suitably when thrusting the electrode body and more stably insert the electrode body into the exterior body.

BRIEF DESCRIPTION OF THE DRAWINGS

FIG. 2 is a schematic longitudinal cross-sectional view taken along the line II-II in

FIG. 1;

FIG. 3 is a schematic longitudinal cross-sectional view taken along the line in

FIG. 1;

FIG. 4 is a schematic transverse cross-sectional view taken along the line IV-IV in

FIG. 1;

DETAILED DESCRIPTION OF THE PREFERRED EMBODIMENTS

Hereinafter, some preferred embodiments of a technology disclosed here will be described with reference to the drawings. Note that matters other than those mentioned particularly in the present specification and necessary for the implementation of the present invention (for example, a general configuration and a manufacturing process of a battery not characterizing the present invention) can be grasped as design matters for skilled persons based on conventional technologies in the field concerned. The technology disclosed here may be implemented on the basis of contents disclosed in the present specification and technological common knowledge in the field concerned.

In the present specification, a "battery" is a term indicating a general storage device from which electric energy is capable of being taken out and is a concept including a primary battery and a secondary battery. Further, in the present specification, a "secondary battery" is a term indicating a general storage device capable of performing repetitive charge and discharge and is a concept including a so-called storage battery (chemical cell) such as a lithium-ion secondary battery and a nickel hydrogen battery and a capacitor (physical cell) such as an electric double layer capacitor.

Battery 100

Figure 1:
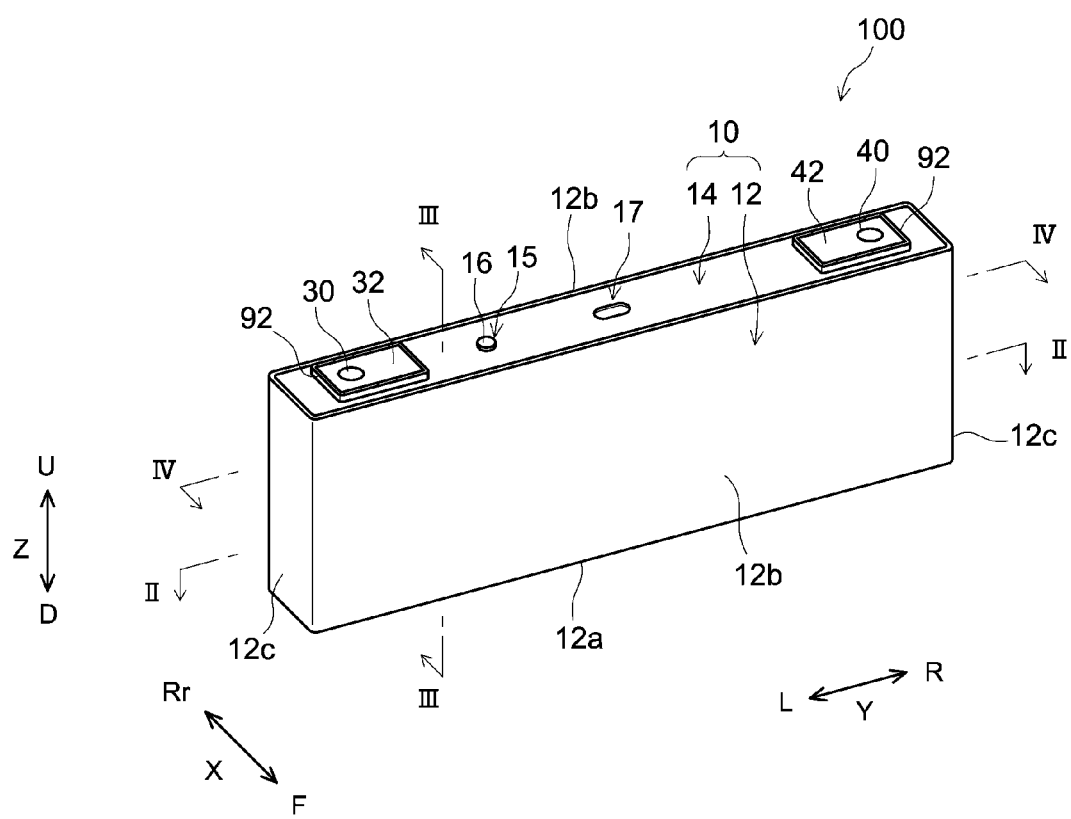
FIG. 1 is a perspective view schematically showing a battery according to an embodiment.
Figure 2:
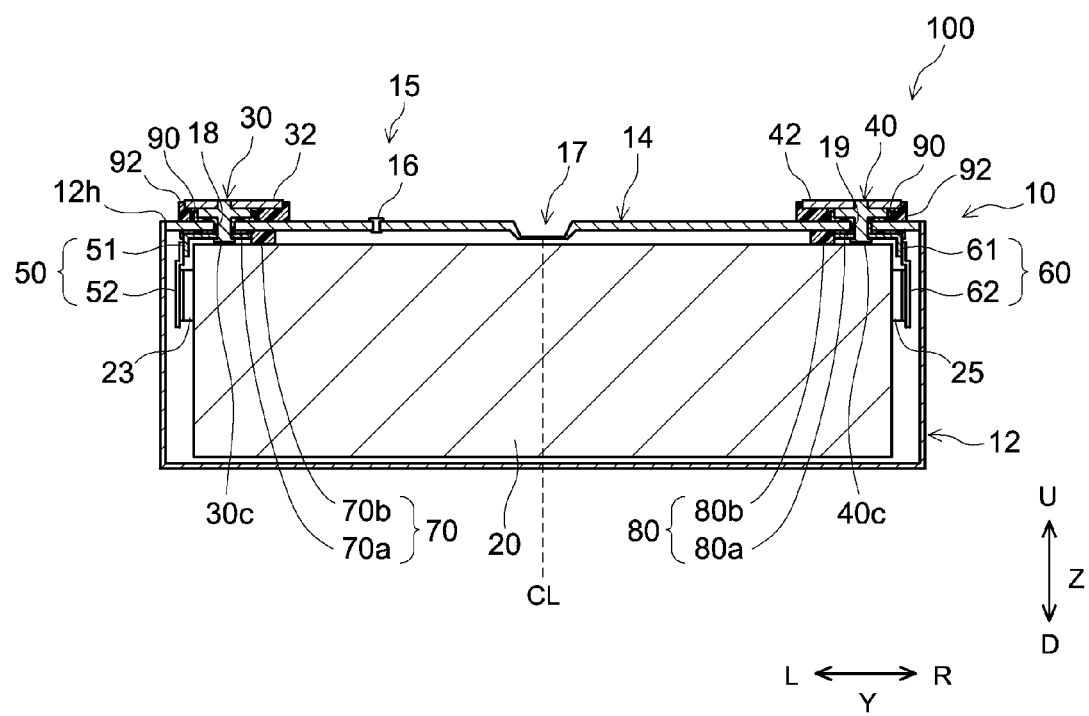
Figure 3:
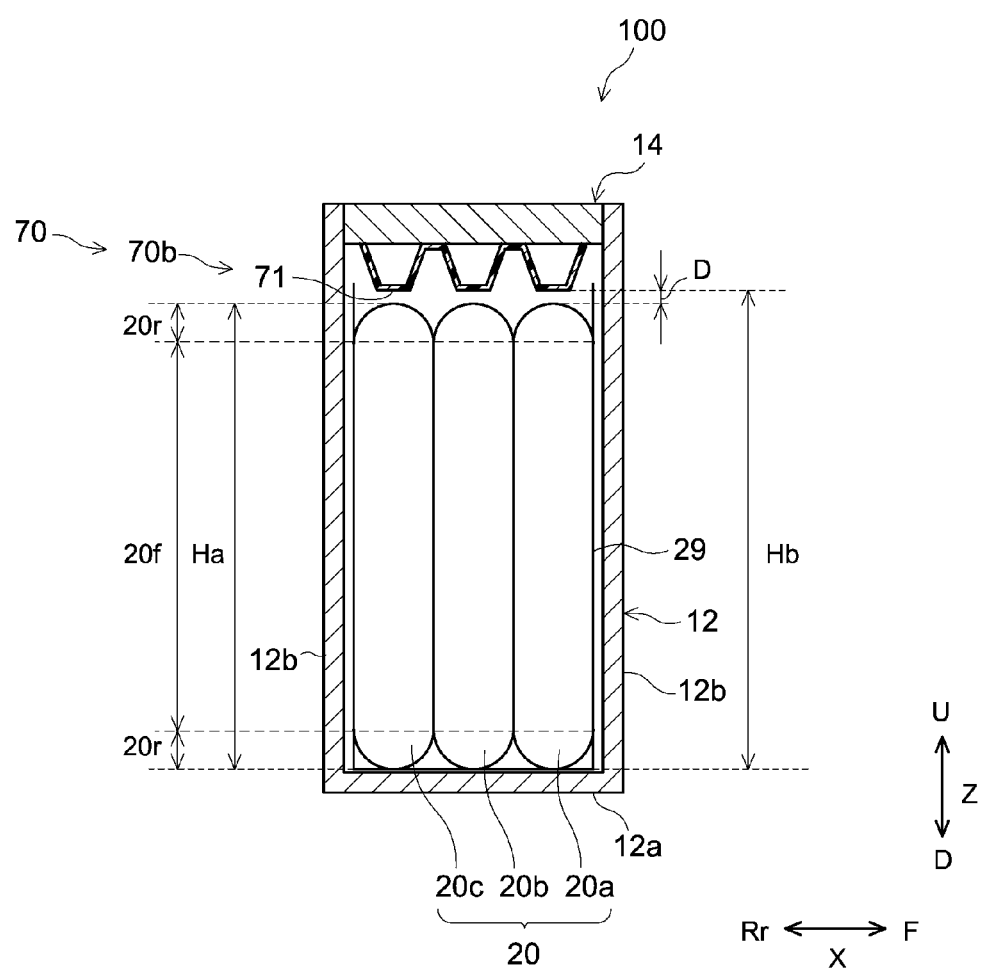
Figure 4:
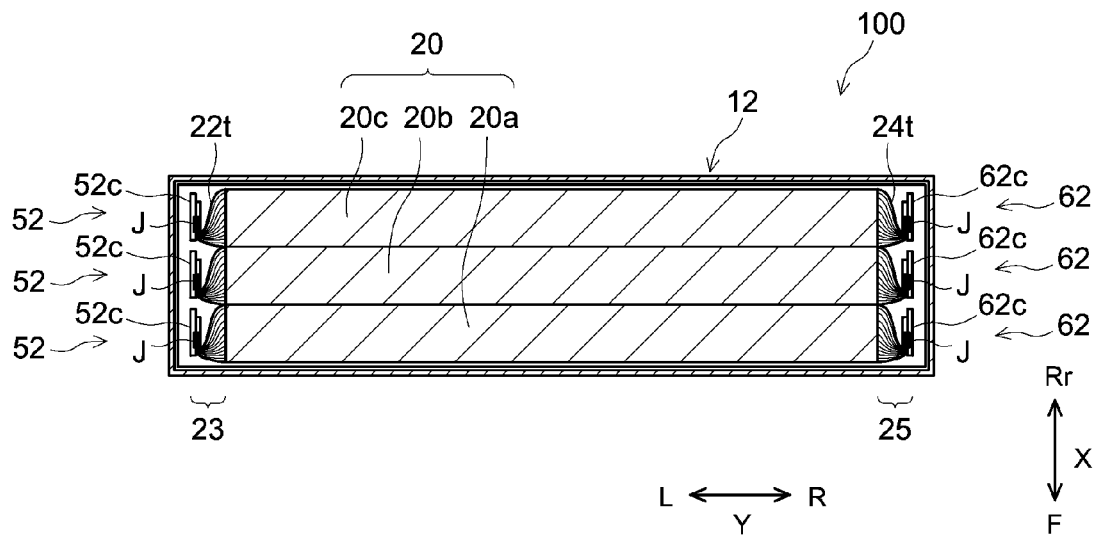

FIG. 1 is a perspective view of a battery 100. FIG. 2 is a schematic longitudinal cross-sectional view taken along the line II-II in FIG. 1. FIG. 3 is a schematic longitudinal cross-sectional view taken along the line in FIG. 1. FIG. 4 is a schematic transverse cross-sectional view taken along the line IV-IV in FIG. 1. Note that in the following description, symbols L, R, F, Rr, U, and D in the drawings show a left side, a right side, a front side, a rear side, an upper side, and a lower side, respectively. Further, symbols X, Y, and Z in the drawings show a short side direction of the battery 100, a long side direction orthogonal to the short side direction, and a vertical direction, respectively. The long side direction is an example of a winding axis direction. However, these directions show directions only for the convenience of explanation and do not intend to limit the installation mode of the battery 100 at all.

As shown in FIG. 2, the battery 100 includes a battery case 10, an electrode body group 20, a positive electrode terminal 30, a negative electrode terminal 40, a positive electrode collecting part 50, a negative electrode collecting part 60, a positive electrode insulating member 70, and a negative electrode insulating member 80. As will be described in detail later, the electrode body group 20 has winding electrode bodies 20a, 20b, and 20c (see FIG. 3). The positive electrode insulating member 70 has a base part 70a and a plurality of protrusion parts 70b. The negative electrode insulating member 80 has a base part 80a and a plurality of protrusion parts 80b. The protrusion parts 70b of the positive electrode insulating member 70 and the protrusion parts 80b of the negative electrode insulating member 80 are an example of spacers arranged between a sealing plate 14 and the winding electrode bodies 20a, 20b, and 20c. Although omitted in the figures, the battery 100 further includes an electrolytic solution here. The battery 100 is a lithium-ion secondary battery here. The battery 100 is characterized by including the winding electrode bodies 20a, 20b, and 20c, and the other configurations may be the same as those of conventional technologies.

The battery case 10 is a housing that accommodates the electrode body group 20. The battery case 10 has a flat and bottomed cuboid (square) outer shape. The material of the battery case 10 may be the same as a conventionally-used one and is not particularly limited. The battery case 10 is preferably made of metal and more preferably made of, for example, aluminum, an aluminum alloy, iron, an iron alloy, or the like. As shown in FIG. 2, the battery case 10 includes an exterior body 12 having an opening 12h and the sealing plate (lid body) 14 that seals the opening 12h.

As shown in FIG. 1, the exterior body 12 includes a bottom wall 12a, a pair of long side walls 12b extending from the bottom wall 12a and facing each other, and a pair of short side walls 12c extending from the bottom wall 12a and facing each other. The bottom wall 12a has a substantially rectangular shape. The bottom wall 12a faces the opening 12h. The areas of the short side walls 12c are smaller than those of the long side walls 12b. The long side walls 12b and the short side walls 12c are an example of first side walls and second side walls disclosed here. The sealing plate 14 is attached so as to seal the opening 12h of the exterior body 12. The sealing plate 14 faces the bottom wall 12a of the exterior body 12. The sealing plate 14 has a substantially rectangular shape in a plan view. The battery case 10 is integrated in such a manner that the sealing plate 14 is joined (for example, welding joint) to the peripheral edge of the opening 12h of the exterior body 12. The battery case 10 is air-tightly sealed.

As shown in FIG. 2, the sealing plate 14 is provided with a solution injection hole 15, a gas discharging valve 17, and two terminal withdrawing holes 18 and 19. The solution injection hole 15 is used to inject an electrolytic solution after the sealing plate 14 is attached to the exterior body 12. The solution injection hole 15 is sealed by the sealing member 16. The gas discharging valve 17 is configured to break and discharge gas inside the battery case 10 to an outside when the pressure inside the battery case 10 becomes a prescribed value or more. The terminal withdrawing holes 18 and 19 are formed at both ends in a long side direction Y of the sealing plate 14, respectively. The terminal withdrawing holes 18 and 19 penetrate the sealing plate 14 in the vertical direction Z. The terminal withdrawing holes 18 and 19 have respective inside diameters of a size at which the positive electrode terminal 30 and the negative electrode terminal 40 before being attached to the sealing plate 14 (before caulking work) are insertable.

Each of the positive electrode terminal 30 and the negative electrode terminal 40 is fixed to the sealing plate 14. The positive electrode terminal 30 is arranged on one side (the left side in FIGS. 1 and 2) in the long side direction Y of the sealing plate 14. The negative electrode terminal 40 is arranged on the other side (the right side in FIGS. 1 and 2) in the long side direction Y of the sealing plate 14. As shown in FIG. 1, the positive electrode terminal 30 and the negative electrode terminal 40 are exposed to the outside surface of the sealing plate 14. As shown in FIG. 2, the positive electrode terminal 30 and the negative electrode terminal 40 are inserted into the terminal withdrawing holes 18 and 19, respectively, and extend from the inside to the outside of the sealing plate 14. Here, the positive electrode terminal 30 and the negative electrode terminal 40 are caulked by caulking work at peripheral edge portions surrounding the terminal withdrawing holes 18 and 19 of the sealing plate 14. Caulking parts 30c and 40c are formed at ends (lower ends in FIG. 2) on the side of the exterior body 12 of the positive electrode terminal 30 and the negative electrode terminal 40.

As shown in FIG. 2, the positive electrode terminal 30 is electrically connected to a positive electrode 22 (see FIG. 7) of the electrode body group 20 via the positive electrode collecting part 50 inside the exterior body 12. The negative electrode terminal 40 is electrically connected to a negative electrode 24 (see FIG. 7) of the electrode body group 20 via the negative electrode collecting part 60 inside the exterior body 12. The positive electrode terminal 30 is insulated from the sealing plate 14 by the positive electrode insulating member 70 and a gasket 90. The negative electrode terminal 40 is insulated from the sealing plate 14 by the negative electrode insulating member 80 and a gasket 90. The positive electrode terminal 30 and the negative electrode terminal 40 are an example of terminals disclosed here.

The positive electrode terminal 30 is preferably made of metal and more preferably made of, for example, aluminum or an aluminum alloy. The negative electrode terminal 40 is preferably made of metal and more preferably made of, for example, copper or a copper alloy. The negative electrode terminal 40 may be configured in such a manner that two conductive members are joined to and integrated with each other. For example, a portion connected to the negative electrode collecting part 60 may be made of copper or a copper alloy, and a portion exposed to the outside surface of the sealing plate 14 may be made of aluminum or an aluminum alloy.

As shown in FIG. 1, a plate-shaped positive electrode outside conductive member 32 and a plate-shaped negative electrode outside conductive member 42 are attached to the outside surface of the sealing plate 14. The positive electrode outside conductive member 32 is electrically connected to the positive electrode terminal 30. The negative electrode outside conductive member 42 is electrically connected to the negative electrode terminal 40. The positive electrode outside conductive member 32 and the negative electrode outside conductive member 42 are members to which a bus bar is annexed when a plurality of batteries 100 are electrically connected to each other. The positive electrode outside conductive member 32 and the negative electrode outside conductive member 42 are preferably made of metal and more preferably made of, for example, aluminum or an aluminum alloy. The positive electrode outside conductive member 32 and the negative electrode outside conductive member 42 are insulated from the sealing plate 14 by outside insulating members 92. However, the positive electrode outside conductive member 32 and the negative electrode outside conductive member 42 are not necessarily provided and may be omitted in other embodiments.

Figure 5:
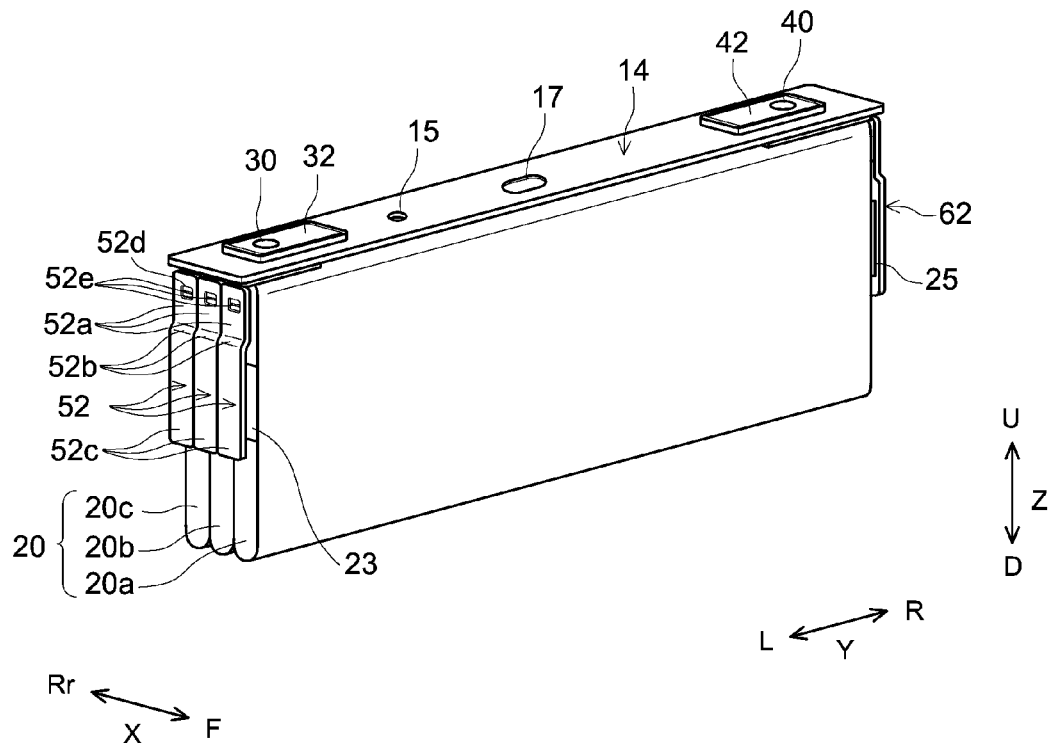
FIG. 5 is a perspective view schematically showing an electrode body group attached to a sealing plate.

FIG. 5 is a perspective view schematically showing the electrode body group 20 attached to the sealing plate 14. Here, the electrode body group 20 has the three winding electrode bodies 20a, 20b, and 20c. However, the number of winding electrode bodies arranged inside the one exterior body 12 is not particularly limited and may be two or more (plural number) or one. The electrode body group 20 is arranged inside the exterior body 12 in a state of being covered with an electrode body holder 29 (see FIG. 3) made of a resinous sheet.

Figure 6:
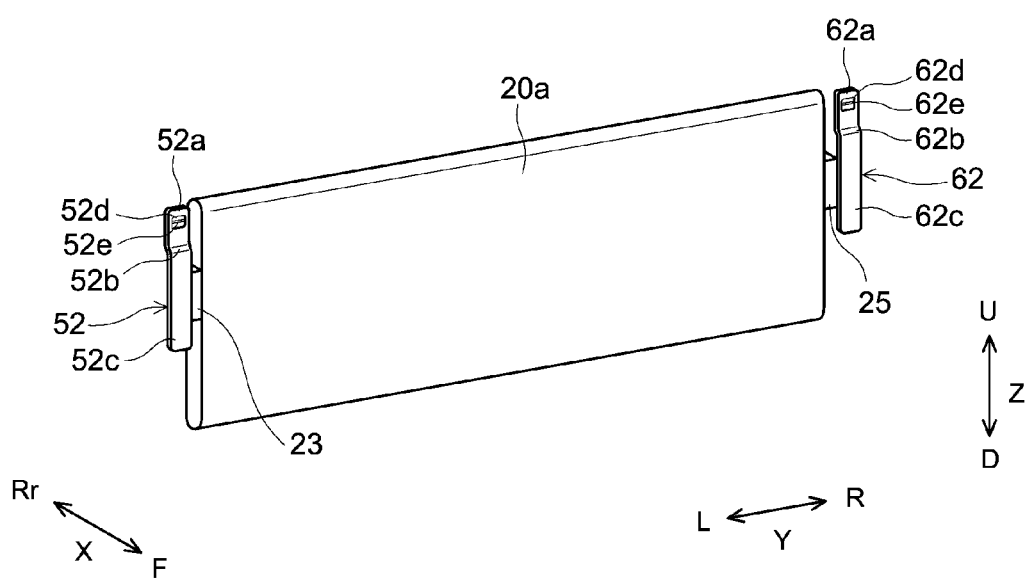
FIG. 6 is a perspective view schematically showing an electrode body to which a positive electrode second collecting part and a negative electrode second collecting part are attached.

FIG. 6 is a perspective view schematically showing the winding electrode body 20a. The winding electrode body 20a is arranged inside the exterior body 12 with its winding axis WL directed parallel to the long side direction Y. In other words, the winding electrode body 20a is arranged inside the exterior body 12 with the winding axis WL directed parallel to the bottom wall 12a and orthogonal to the short side walls 12c. The end surfaces of the winding electrode body 20a (in other words, laminated surfaces where the positive electrode 22 and the negative electrode 24 are laminated with each other, end surfaces in the long side direction Y in FIG. 7) face the short side walls 12c.

Figure 7:
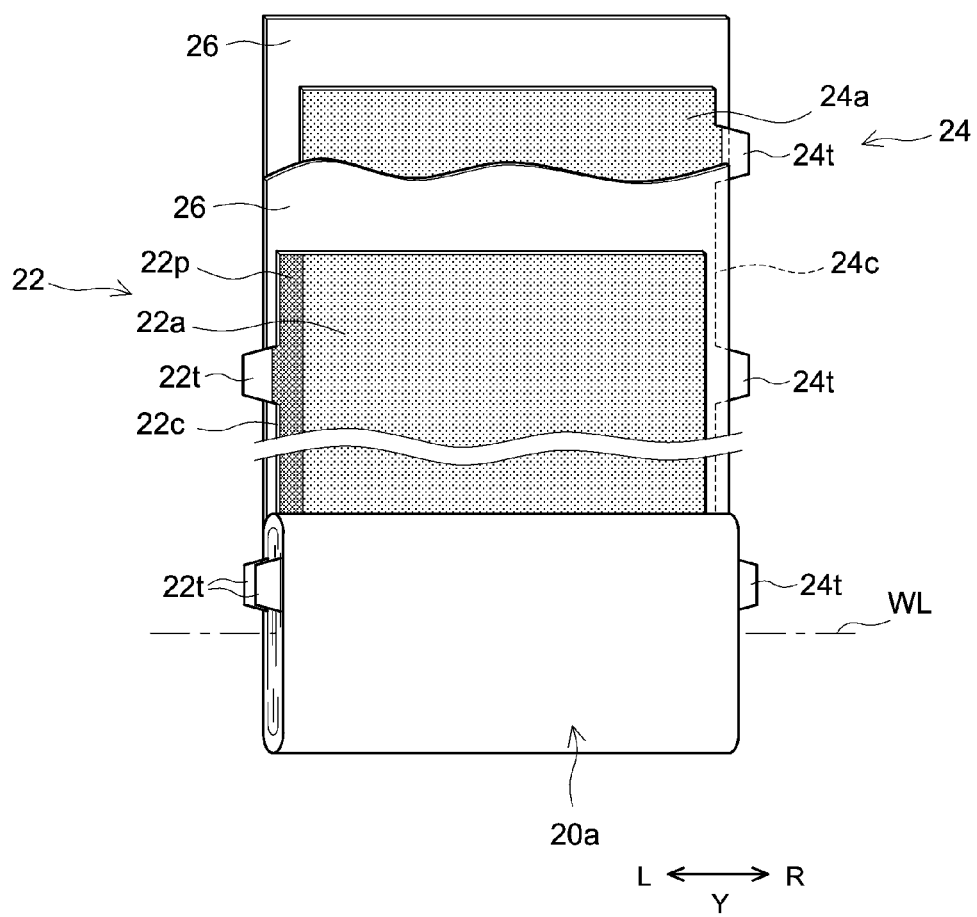
FIG. 7 is a schematic view showing the configuration of the winding electrode body.

FIG. 7 is a schematic view showing the configuration of the winding electrode body 20a. The winding electrode body 20a has the positive electrode 22, the negative electrode 24, and a separator 26. Here, the winding electrode body 20a is configured in such a manner that the strip-shaped positive electrode 22 and the strip-shaped negative electrode 24 are laminated with each other via the strip-shaped separator 26 and wound about the winding axis WL. The winding electrode body 20a has a flat shape.

As shown in FIG. 7, the positive electrode 22 has a positive electrode collector 22c and a positive electrode active material layer 22a and a positive electrode protection layer 22p that are fixed onto at least one surface of the positive electrode collector 22c. However, the positive electrode protection layer 22p is not necessarily provided and may be omitted in other embodiments. The positive electrode collector 22c has a strip shape. The positive electrode collector 22c is made of, for example, conductive metal such as aluminum, an aluminum alloy, nickel, and stainless steel. Here, the positive electrode collector 22c is metal foil and specifically aluminum foil.

At one end (the left end in FIG. 7) in the long side direction Y of the positive electrode collector 22c, a plurality of positive electrode tabs 22t are provided. The plurality of positive electrode tabs 22t protrude toward one side (the left side in FIG. 7) in the long side direction Y. The plurality of positive electrode tabs 22t protrude farther in the long side direction Y than the separator 26. The plurality of positive electrode tabs 22t are (intermittently) provided at intervals along the longitudinal direction of the positive electrode 22. Here, the positive electrode tabs 22t are a part of the positive electrode collector 22c and made of metal foil (aluminum foil). Here, each of the positive electrode tabs 22t has a trapezoidal shape. The positive electrode tabs 22t are portions (collector exposing parts) at which the positive electrode active material layer 22a and the positive electrode protection layer 22p of the positive electrode collector 22c are not formed. However, the positive electrode tabs 22t may be members different from the positive electrode collector 22c. Further, the positive electrode tabs 22t may be provided at the other end (the right end in FIG. 7) in the long side direction Y, or may be provided at both respective ends in the long side direction Y.

As shown in FIG. 4, the plurality of positive electrode tabs 22t are laminated with each other at the one end (the left end in FIG. 4) in the long side direction Y and constitute a positive electrode tab group 23. The plurality of positive electrode tabs 22t are folded and curved so as to make their outward-side ends aligned with each other. The positive electrode tab group 23 is electrically connected to the positive electrode terminal 30 via the positive electrode collecting part 50. The plurality of positive electrode tabs 22t are preferably folded and electrically connected to the positive electrode terminal 30. A positive electrode second collecting part 52 that will be described later is annexed to the positive electrode tab group 23. The sizes (a length in the long side direction Y and a width orthogonal to the long side direction Y, see FIG. 7) of the plurality of positive electrode tabs 22t may be appropriately adjusted according to, for example, their forming positions or the like in consideration of a state in which the plurality of positive electrode tabs 22t are connected to the positive electrode collecting part 50. Here, the sizes of the plurality of positive electrode tabs 22t are different from each other so that the outward-side ends are aligned with each other when curved.

As shown in FIG. 7, the positive electrode active material layer 22a is provided in a strip shape along the longitudinal direction of the strip-shaped positive electrode collector 22c. The positive electrode active material layer 22a contains a positive electrode active material (for example, a lithium transition metal composite oxide such as a lithium-nickel-cobalt-manganese composite oxide) capable of reversibly occluding and releasing a charge carrier. When the entire solid content of the positive electrode active material layer 22a is 100 mass %, the positive electrode active material may generally account for 80 mass % or more, typically account for 90 mass % or more, and account for, for example, 95 mass % or more. The positive electrode active material layer 22a may contain an arbitrary component other than the positive electrode active material, such as a conductive material, a binder, and various additive components. As the conductive material, a carbon material such as acetylene black (AB) can be, for example, used. As the binder, polyvinylidene fluoride (PVdF) can be, for example, used.

As shown in FIG. 7, the positive electrode protection layer 22p is provided at the boundary portion between the positive electrode collector 22c and the positive electrode active material layer 22a in the long side direction Y. Here, the positive electrode protection layer 22p is provided at the one end (the left end in FIG. 7) in the long side direction Y of the positive electrode collector 22c. However, the positive electrode protection layer 22p may be provided at both ends in the long side direction Y. The positive electrode protection layer 22p is provided in a strip shape along the positive electrode active material layer 22a. The positive electrode protection layer 22p contains an inorganic filler (for example, alumina). When the entire solid content of the positive electrode protection layer 22p is 100 mass %, the inorganic filler may generally account for 50 mass % or more, typically account for 70 mass % or more, and account for, for example, 80 mass % or more. The positive electrode protection layer 22p may contain an arbitrary component other than the inorganic filler, such as a conductive material, a binder, and various additive components. The conductive material and the binder may be the same as those that can be contained in the positive electrode active material layer 22a exemplified above.

As shown in FIG. 7, the negative electrode 24 has a negative electrode collector 24c and a negative electrode active material layer 24a that is fixed onto at least one surface of the negative electrode collector 24c. The negative electrode collector 24c has a strip shape. The negative electrode collector 24c is made of, for example, conductive metal such as copper, a copper alloy, nickel, and stainless steel. Here, the negative electrode collector 24c is metal foil and specifically copper foil.

At one end (the right end in FIG. 7) in the long side direction Y of the negative electrode collector 24c, a plurality of negative electrode tabs 24t are provided. The plurality of negative electrode tabs 24t protrude toward one side (the right side in FIG. 7) in the long side direction Y. The plurality of negative electrode tabs 24t protrude farther in the long side direction Y than the separator 26. The plurality of negative electrode tabs 24t are (intermittently) provided at intervals along the longitudinal direction of the negative electrode 24. Here, the negative electrode tabs 24t are a part of the negative electrode collector 24c and made of metal foil (copper foil). Here, each of the plurality of negative electrode tabs 24t has a trapezoidal shape. Here, the negative electrode tabs 24t are portions (collector exposing parts) at which the negative electrode active material layer 24a of the negative electrode collector 24c is not formed. However, the negative electrode tabs 24t may be members different from the negative electrode collector 24c. Further, the negative electrode tabs 24t may be provided at the other end (the right end in FIG. 7) in the long side direction Y, or may be provided at both respective ends in the long side direction Y.

As shown in FIG. 4, the plurality of negative electrode tabs 24t are laminated with each other at the one end (the right end in FIG. 6) in the long side direction Y and constitute a negative electrode tab group 25. The plurality of negative electrode tabs 24t are folded and curved so as to make their outward-side ends aligned with each other. The negative electrode tab group 25 is electrically connected to the negative electrode terminal 40 via the negative electrode collecting part 60. The plurality of negative electrode tabs 24t are preferably folded and electrically connected to the negative electrode terminal 40. A negative electrode second collecting part 62 that will be described later is annexed to the negative electrode tab group 25. The sizes (a length in the long side direction Y and a width orthogonal to the long side direction Y, see FIG. 7) of the plurality of negative electrode tabs 24t may be appropriately adjusted according to, for example, their forming positions or the like in consideration of a state in which the plurality of negative electrode tabs 24t are connected to the negative electrode collecting part 60. Here, the sizes of the plurality of negative electrode tabs 24t are different from each other so that the outward-side ends are aligned with each other when curved.

As shown in FIG. 7, the negative electrode active material layer 24a is provided in a strip shape along the longitudinal direction of the strip-shaped negative electrode collector 24c. The negative electrode active material layer 24a contains a negative electrode active material (for example, a carbon material such as graphite) capable of reversibly occluding and releasing a charge carrier. When the entire solid content of the negative electrode active material layer 24a is 100 mass %, the negative electrode active material may generally account for 80 mass % or more, typically account for 90 mass % or more, and account for, for example, 95 mass % or more. The negative electrode active material layer 24a may contain an arbitrary component other than the negative electrode active material, such as a binder, a dispersing agent, and various additive components. As the binder, rubbers such as styrene butadiene rubber (SBR) can be, for example, used. As the dispersing agent, celluloses such as carboxymethyl cellulose (CMC) can be, for example, used.

The separator 26 is a member that insulates the positive electrode active material layer 22a of the positive electrode 22 and the negative electrode active material layer 24a of the negative electrode 24 from each other. The separator 26 constitutes the outside surface of the winding electrode body 20a. As the separator 26, a resinous porous sheet made of a polyolefin resin such as polyethylene (PE) and polypropylene (PP) is, for example, suitable. Here, the separator 26 has a base material part made of a resinous porous sheet and a heat resistance layer (HRL) formed on at least one surface of the base material part. The heat resistance layer is typically a layer containing an inorganic filler and a binder.

As the inorganic filler, alumina, boehmite, aluminum hydroxide, titania, or the like can be, for example, used. As the binder, polyvinylidene fluoride (PVdF) or the like can be, for example, used.

As shown in FIG. 3, the winding electrode body 20a has a pair of curvature parts (R parts) 20r that face the bottom wall 12a of the exterior body 12 and the sealing plate 14 and a flat part 20f that connects the pair of curvature parts 20r to each other and faces the long side walls 12b of the exterior body 12. Here, one (an upper one in FIG. 3) of the curvature parts 20r indirectly faces the sealing plate 14 via a positive electrode first collecting part 51, a negative electrode first collecting part 61, the positive electrode insulating member 70, the negative electrode insulating member 80, or the like that will be described later. Here, the other (a lower one in FIG. 3) of the curvature parts 20r indirectly faces the bottom wall 12a via the electrode body holder 29. Note that although the winding electrode body 20a will be described in detail below as an example, the winding electrode bodies 20b and 20c may have the same configuration.

Figure 8:
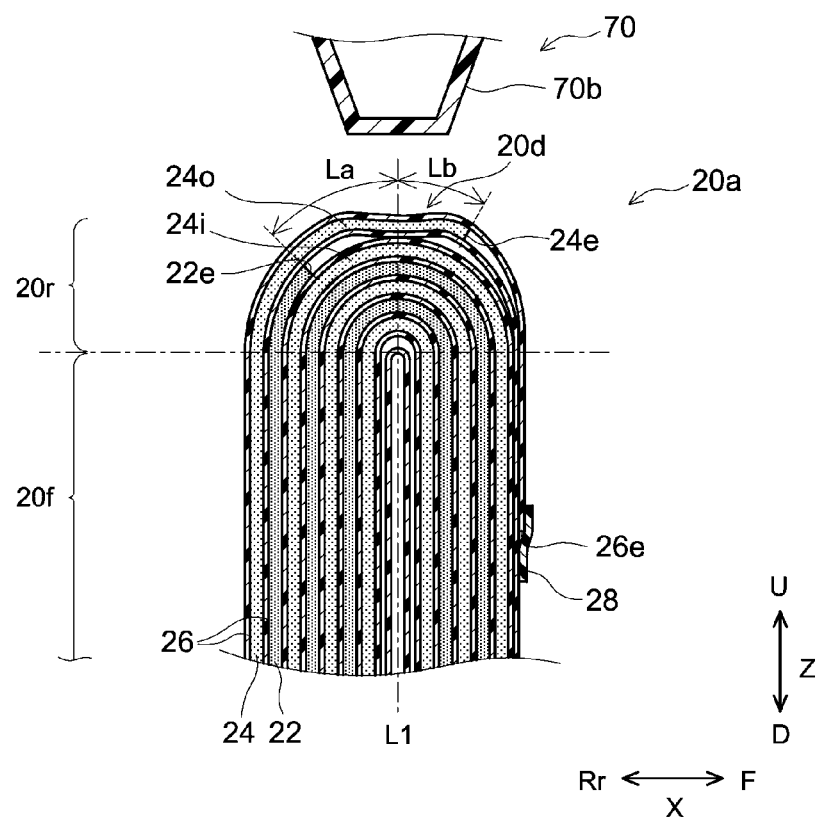
FIG. 8 is a partially-enlarged cross-sectional view schematically showing the vicinity of the upper end of the winding electrode body in FIG. 3.

FIG. 8 is a partially-enlarged cross-sectional view schematically showing the vicinity of the upper end of the winding electrode body 20a in FIG. 3. In FIG. 8, a line perpendicular to the winding axis WL of the winding electrode body 20a and perpendicular to the bottom wall 12a is indicated as a line L1. Note that when the respective apexes (the upper end and the lower end of the winding electrode body 20a in FIG. 3) of the pair of curvature parts 20r of the winding electrode body 20a are not crushed, a line connecting the pair of apexes to each other is more preferably assumed as the line L1.

In the curvature part 20r facing the sealing plate 14, a portion 24o positioned at the outermost peripheral part of the negative electrode 24 faces a portion 24i positioned on the winding inner peripheral side of the negative electrode 24 via the separator 26 on the line L1. The portion 24o positioned at the outermost peripheral part of the negative electrode 24 does not face the positive electrode 22. Thus, even if the winding electrode body 20a is strongly pressed by the bottom wall 12a of the exterior body 12 directly or via other members such as the electrode body holder 29 and the separator 26 is damaged, it is possible to prevent the short circuit between the portion 24o positioned at the outermost peripheral part of the negative electrode 24 and the positive electrode 22 positioned on the winding inner peripheral side. Further, even if the curvature part 20r of the winding electrode body 20a is strongly pressed by the protrusion part 70b of the positive electrode insulating member 70 and the separator 26 is damaged in an insertion step that will be described later, it is possible to prevent the short circuit between the portion 24o positioned at the outermost peripheral part of the negative electrode 24 and the positive electrode 22 positioned on the winding inner peripheral side. Note that the protrusion part 70b (spacer) of the positive electrode insulating member 70 that will be described later is particularly preferably positioned on the line L1. Thus, it is possible to improve the insertion of the winding electrode body 20a into the exterior body 12. Further, it is possible to prevent the movement of the winding electrode body 20a toward the sealing plate 14.

In the curvature part 20r, the portion closest to the protrusion part 70b of the positive electrode insulating member 70 crosses the line L1. In the portion of the curvature part 20r closest to the protrusion part 70b, the portion 24o positioned at the outermost peripheral part of the negative electrode 24 faces the portion 24i positioned on the winding inner peripheral side of the negative electrode 24 via the separator 26 on the line L1. The portion 24o positioned at the outermost peripheral part of the negative electrode 24 does not face the positive electrode 22. Thus, the winding electrode body 20a is not liable to move greatly toward the sealing plate 14. Therefore, it is possible to prevent damage on the separator 26 caused when the winding electrode body 20a contacts the sealing plate 14. Thus, it is possible to effectively prevent the short circuit between the positive electrode 22 and the negative electrode 24. Further, it is possible to reduce loads on the positive electrode tab group 23 and/or the negative electrode tab group 25 and stably maintain electrical connection with the positive electrode terminal 30 and/or the negative electrode terminal 40. Thus, it is possible to improve the conduction reliability of the battery.

In a winding direction orthogonal to the winding axis WL, a winding terminal 22e of the positive electrode 22 is arranged closer to an inner peripheral side than a winding terminal 24e of the negative electrode 24. The winding terminal 22e of the positive electrode 22 is preferably positioned at one of the curvature parts 20r. Here, the winding terminal 22e of the positive electrode 22 is positioned at the curvature part 20r facing the sealing plate 14. With this configuration, it is possible to prevent the generation of a step at a position corresponding to the winding terminal 22e in the flat part 20f of the winding electrode body 20a. Thus, it is possible to prevent the slight short circuit or the like between the positive electrode and the negative electrode caused by the precipitation of metal lithium (dendrite) even when a large pressure is locally applied to the flat part 20f.

The winding terminal 22e of the positive electrode 22 is arranged closer to the winding inner peripheral side than the line L1. In FIG. 8, a length from the winding terminal 22e of the positive electrode 22 to the line L1 is indicated as La. The length La is preferably 0.1 mm to 20 mm, more preferably 0.1 mm to 9 mm, and further more preferably 3 mm to 7 mm. The length La may be 5 mm or more. Thus, it is possible to more effectively prevent the short circuit between the positive electrode 22 and the negative electrode 24.

A winding terminal 24e of the negative electrode 24 is arranged closer to a winding outer peripheral side than a winding terminal 22e of the positive electrode 22. The winding terminal 24e of the negative electrode 24 is preferably positioned at one of the curvature parts 20r. Here, the winding terminal 24e of the negative electrode 24 is positioned at the curvature part 20r facing the sealing plate 14. With this configuration, it is possible to prevent the generation of a step at a position corresponding to the winding terminal 24e in the flat part 20f of the winding electrode body 20a. Thus, even when a large pressure is locally applied to the flat part 20f, it is possible to prevent the slight short circuit or the like between the positive electrode and the negative electrode caused by the precipitation of metal lithium (dendrite).

The winding terminal 24e of the negative electrode 24 is arranged closer to the winding outer peripheral side than the line L1 (in other words, a position over the line L1). In FIG. 8, a length from the line L1 to the winding terminal 24e of the negative electrode 24 is indicated as Lb. The length Lb is preferably 0.1 mm to 20 mm, more preferably 0.1 mm to 9 mm, and further more preferably 3 mm to 7 mm Thus, it is possible to more effectively prevent the short circuit between the positive electrode 22 and the negative electrode 24. However, the winding terminal 24e of the negative electrode 24 may be arranged on the line L1. The length Lb may be 0 mm.

In FIG. 8, a length from the winding terminal 22e of the positive electrode 22 to the winding terminal 24e of the negative electrode 24 is indicated as La+Lb. The winding terminal 24e of the negative electrode 24 is arranged at a position ahead of the winding terminal 22e of the positive electrode 22 by the length La+Lb in the winding direction. The length La+Lb is preferably 0.1 mm or more, more preferably 0.1 mm to 18 mm, and further more preferably 6 mm to 14 mm Thus, it is possible to more effectively prevent the short circuit between the positive electrode 22 and the negative electrode 24.

A winding terminal 26e of the separator 26 is arranged closer to the winding outer peripheral side than the winding terminal 22e of the positive electrode 22 and the winding terminal 24e of the negative electrode 24. The winding terminal 26e of the separator 26 is arranged at a position ahead of the winding terminal 24e of the negative electrode 24 in the winding direction. A fastening tape 28 is attached to the winding terminal 26e of the separator 26. The fastening tape 28 is arranged at the flat part 20f so that its whole area does not put on the curvature part 20r.

The winding terminal 26e of the separator 26 is preferably positioned at the flat part 20f. With such a configuration, it is possible to effectively prevent a fluctuation in the thickness (the length in a short side direction X in FIG. 8) of the plurality of winding electrode bodies 20a, 20b, and 20c. As a result, it is possible to charge and discharge the plurality of winding electrode bodies 20a, 20b, and 20c in a balanced manner Note that a part of the fastening tape 28 could be arranged at the flat part 20f depending on circumstances when the winding terminal 26e of the separator 26 is arranged at one of the curvature parts 20r, which possibly results in a fluctuation in the thickness of the winding electrode body 20a.

The curvature part 20r facing the sealing plate 14 has a recessed part 20d. In the insertion step that will be described later, the recessed part 20d is formed when the winding electrode body 20a is pressed by the protrusion part 70b of the positive electrode insulating member 70 and/or the protrusion part 80b of the negative electrode insulating member 80. Here, the recessed part 20d is formed between the winding terminal 22e of the positive electrode 22 and the winding terminal 24e of the negative electrode 24 (that is, within the range of the length La+Lb). At the recessed part 20d, the portion 24o positioned at the outermost peripheral part of the negative electrode 24 and the separator 26 are crushed so as to come close to the portion 24i positioned on the winding inner peripheral side of the negative electrode 24.

Although omitted in the figures, the separator 26 has the heat resistance layer arranged closer to the side of the outside surface than the base material part on the outermost peripheries of the winding electrode bodies 20a, 20b, and 20c. The outside surfaces of the winding electrode bodies 20a, 20b, and 20c are covered with the heat resistance layer of the separator 26. Since the outside surfaces of the winding electrode bodies 20a, 20b, and 20c are covered with the heat resistance layer at least at one of the pair of curvature parts 20r, it is possible to relax stress applied to the curvature parts 20r even if the curvature parts 20r contact the bottom wall 12a and/or the sealing plate 14. Thus, the separator 26 is not liable to be damaged. Further, even if the separator 26 is damaged, it is possible to prevent the short circuit between the portion 24o positioned at the outermost peripheral part of the negative electrode 24 and the positive electrode 22 positioned on the winding inner peripheral side.

The electrolytic solution may be a conventional type and is not particularly limited. The electrolytic solution is, for example, a nonaqueous electrolytic solution containing a nonaqueous system solvent and supporting salt. The nonaqueous system solvent contains, for example, carbonates such as ethylene carbonate, dimethyl carbonate, and ethyl methyl carbonate. The supporting salt is, for example, fluorine-containing lithium salt such as LiPF6. However, the electrolytic solution may be a solid state (solid electrolytic) and integrated with the electrode body group 20.

The positive electrode collecting part 50 constitutes a conduction path that electrically connects the positive electrode tab group 23 including the plurality of positive electrode tabs 22t and the positive electrode terminal 30 to each other. As shown in FIG. 2, the positive electrode collecting part 50 includes the positive electrode first collecting part 51 and the positive electrode second collecting part 52. The positive electrode first collecting part 51 and the positive electrode second collecting part 52 may be made of the same metal type as that of the positive electrode collector 22c, for example, conductive metal such as aluminum, an aluminum alloy, nickel, and stainless steel.

Figure 9:
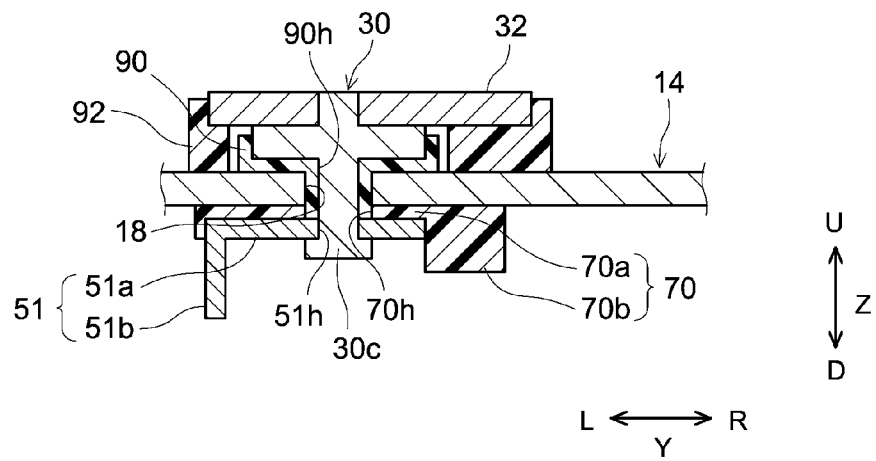
FIG. 9 is a partially-enlarged cross-sectional view schematically showing the vicinity of a positive electrode terminal in FIG. 2.
Figure 10:
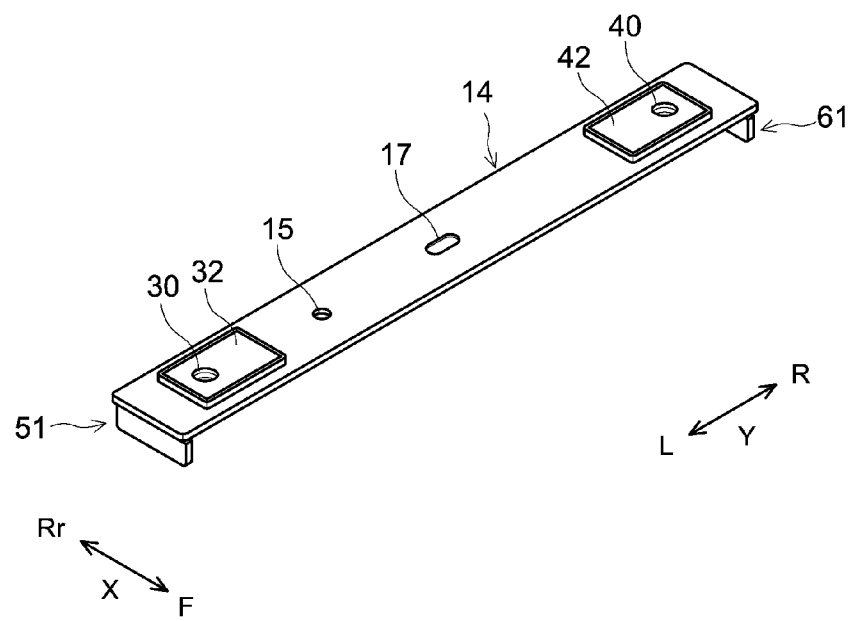
FIG. 10 is a perspective view schematically showing the sealing plate in which the positive electrode terminal, a negative electrode terminal, a positive electrode first collecting part, a negative electrode first collecting part, a positive electrode insulating member, and a negative electrode insulating member are attached.
Figure 11:
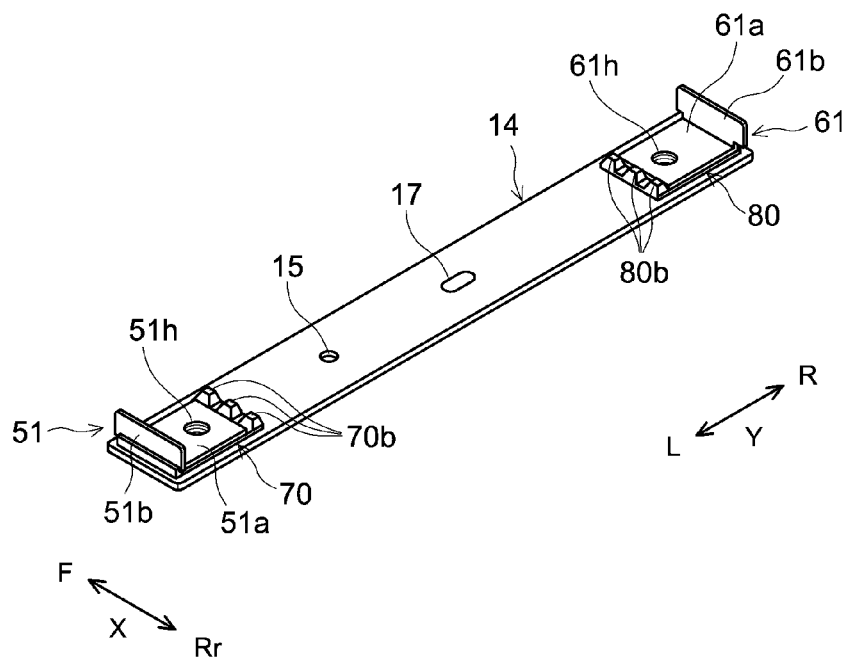
FIG. 11 is a perspective view in which the sealing plate in FIG. 10 is reversed.

FIG. 9 is a partially-enlarged cross-sectional view schematically showing the vicinity of the positive electrode terminal 30 in FIG. 2. FIG. 10 is a perspective view schematically showing the sealing plate 14. FIG. 11 is a perspective view in which the sealing plate in FIG. 10 is reversed. FIG. 11 shows the surface on the side (inside) of the exterior body 12 of the sealing plate 14. As shown in FIGS. 9 to 11, the positive electrode first collecting part 51 is attached to the inside surface of the sealing plate 14. The positive electrode first collecting part 51 is an example of a collecting part disclosed here. The positive electrode first collecting part 51 has a first region 51a and a second region 51b. The positive electrode first collecting part 51 may be configured in such a manner that one member is folded by, for example, press work or the like, or may be configured in such a manner that a plurality of members are integrated with each other by welding joint or the like. Here, the positive electrode first collecting part 51 is fixed to the sealing plate 14 by caulking work.

The first region 51a is a portion arranged between the sealing plate 14 and the electrode body group 20. The first region 51a extends along the long side direction Y. The first region 51a spreads horizontally along the inside surface of the sealing plate 14. The positive electrode insulating member 70 is arranged between the sealing plate 14 and the first region 51a. The first region 51a is insulated from the sealing plate 14 by the positive electrode insulating member 70. Here, the first region 51a is electrically connected to the positive electrode terminal 30 by caulking work. In the first region 51a, a through-hole 51h penetrating in the vertical direction Z is formed at a position corresponding to the terminal withdrawing hole 18 of the sealing plate 14. The second region 51b is a portion arranged between the short side wall 12c of the exterior body 12 and the electrode body group 20. The second region 51b extends from one side end (the left end in FIG. 9) in the long side direction Y of the first region 51a to the short side wall 12c of the exterior body 12. The second region 51b extends along the vertical direction Z.

The positive electrode second collecting part 52 extends along the short side wall 12c of the exterior body 12. As shown in FIG. 6, the positive electrode second collecting part 52 has a collecting plate connection part 52a, an inclined part 52b, and a tab joining part 52c. The collecting plate connection part 52a is a portion electrically connected to the positive electrode first collecting part 51. The collecting plate connection part 52a extends along the vertical direction Z. The collecting plate connection part 52a is arranged substantially perpendicular to the winding axis WL of the winding electrode bodies 20a, 20b, and 20c. The collecting plate connection part 52a is provided with a recessed part 52d thinner than its periphery. The recessed part 52d is provided with a through-hole 52e penetrating in the short side direction X. The through-hole 52e has a joining part joined to the positive electrode first collecting part 51. The joining part is, for example, a weld joining part formed by welding such as ultrasonic wave welding, resistance welding, and laser welding. The positive electrode second collecting part 52 may be provided with a fuse.

The tab joining part 52c is a portion annexed to the positive electrode tab group 23 and electrically connected to the plurality of positive electrode tabs 22t. As shown in FIG. 5, the tab joining part 52c extends along the vertical direction Z. The tab joining part 52c is arranged substantially perpendicular to the winding axis WL of the winding electrode bodies 20a, 20b, and 20c. The surface of the tab joining part 52c that is connected to the plurality of positive electrode tabs 22t is arranged substantially parallel to the short side wall 12c of the exterior body 12. As shown in FIG. 4, the tab joining part 52c has a joining part J joined to the positive electrode tab group 23. The joining part J is, for example, a welding joint part formed by welding such as ultrasonic wave welding, resistance welding, and laser welding in a state in which the plurality of positive electrode tabs 22t are overlapped with each other. The welding joint part is arranged with the plurality of positive electrode tabs 22t approaching one side in the short side direction X of the winding electrode bodies 20a, 20b, and 20c. Thus, it is possible to more suitably fold the plurality of positive electrode tabs 22t and stably form the positive electrode tab group 23 having a curvature shape as shown in FIG. 4.

The inclined part 52b is a portion that connects the lower end of the collecting plate connection part 52a and the upper end of the tab joining part 52c to each other. The inclined part 52b is inclined with respect to the collecting plate connection part 52a and the tab joining part 52c. The inclined part 52b connects the collecting plate connection part 52a and the tab joining part 52c to each other so that the collecting plate connection part 52a is positioned closer to a central side than the tab joining part 52c in the long side direction Y. Thus, it is possible to expand the accommodation space of the electrode body group 20 to increase the high energy density of the battery 100. The lower end (in other words, the end on the side of the bottom wall 12a of the exterior body 12) of the inclined part 52b is preferably positioned below the lower end of the positive electrode tab group 23. Thus, it is possible to more suitably fold the plurality of positive electrode tabs 22t and stably form the positive electrode tab group 23 having a curvature shape as shown in FIG. 4.

The negative electrode collecting part 60 constitutes a conduction path that electrically connects the negative electrode tab group 25 including the plurality of negative electrode tabs 24t and the negative electrode terminal 40 to each other. As shown in FIG. 2, the negative electrode collecting part 60 includes the negative electrode first collecting part 61 and the negative electrode second collecting part 62. The negative electrode first collecting part 61 is an example of a collecting part disclosed here. The negative electrode first collecting part 61 and the negative electrode second collecting part 62 may be made of the same metal type as that of the negative electrode collector 24c, for example, conductive metal such as copper, a copper alloy, nickel, and stainless steel. The configurations of the negative electrode first collecting part 61 and the negative electrode second collecting part 62 may be the same as those of the positive electrode first collecting part 51 and the positive electrode second collecting part 52 of the positive electrode collecting part 50.

As shown in FIG. 11, the negative electrode first collecting part 61 has a first region 61a and a second region 61b. The negative electrode insulating member 80 is arranged between the sealing plate 14 and the first region 61a. The first region 61a is insulated from the sealing plate 14 by the negative electrode insulating member 80. In the first region 61a, a through-hole 61h penetrating in the vertical direction Z is formed at a position corresponding to the terminal withdrawing hole 19 of the sealing plate 14. As shown in FIG. 6, the negative electrode second collecting part 62 has a collecting plate connection part 62a electrically connected to the negative electrode first collecting part 61, an inclined part 62b, and a tab joining part 62c that is annexed to the negative electrode tab group 25 and electrically connected to the plurality of negative electrode tabs 24t. The collecting plate connection part 62a has a recessed part 62d connected to the tab joining part 62c. The recessed part 62d is provided with a through-hole 62e penetrating in the short side direction X.

The positive electrode insulating member 70 is a member that insulates the sealing plate 14 and the positive electrode first collecting part 51 from each other. Note that although the positive electrode insulating member 70 will be described in detail below as an example, the negative electrode insulating member 80 may have the same configuration. The positive electrode insulating member 70 preferably has resistance and electrical insulating properties with respect to a used electrolytic solution, made of an elastically-deformable resin material, and made of, for example, a polyolefin resin such as polypropylene (PP), a fluorinated resin such as tetrafluoroethylene-perfluoroalkoxyethylene copolymer (PFA), polyphenylene sulfide (PPS), or the like.

As shown in FIG. 2, the positive electrode insulating member 70 has the base part 70a and the plurality of protrusion parts 70b. Here, the base part 70a and the protrusion parts 70b are integrally molded. Here, the positive electrode insulating member 70 is an integrated molded article obtained by integrally molding resin materials as described above. Thus, compared with a case in which the base part 70a and the protrusion parts 70b are members different from each other, it is possible to reduce the number of used members and realize cost reduction. Further, it is possible to more easily prepare the positive electrode insulating member 70.

The base part 70a is a portion arranged between the sealing plate 14 and the first region 51a of the positive electrode first collecting part 51 in the vertical direction Z. The base part 70a spreads horizontally along the first region 51a of the positive electrode first collecting part 51. As shown in FIG. 9, the base part 70a has a through-hole 70h penetrating in the vertical direction Z. The through-hole 70h is formed at a position corresponding to the terminal withdrawing hole 18 of the sealing plate 14.

Each of the plurality of protrusion parts 70b protrudes closer to the side of the electrode body group 20 than the base part 70a. As shown in FIG. 11, the plurality of protrusion parts 70b are provided closer to the central side (the right side in FIG. 11) of the sealing plate 14 than the base part 70a in the long side direction Y. The plurality of protrusion parts 70b are arranged side by side in the short side direction X. As shown in FIG. 3, the plurality of protrusion parts 70b here face the curvature parts 20r of the winding electrode bodies 20a, 20b, and 20c constituting the electrode body group 20. Thus, it is possible to prevent the end surfaces of the winding electrode bodies 20a, 20b, and 20c from being pressed by the protrusion parts 70b and damaged.

Here, the number of the protrusion parts 70b is the same as the number of the winding electrode bodies 20a, 20b, and 20c constituting the electrode body group 20, i.e., three. Thus, it is possible to make the winding electrode bodies 20a, 20b, and 20c and the protrusion parts 70b more reliably face each other and more effectively exhibit the effect of the technology disclosed here. Further, it is possible to make the winding electrode bodies 20a, 20b, and 20c and the protrusion parts 70b contact each other in a balanced manner in the insertion step that will be described later. However, the number of the protrusion parts 70b may be different from the number of electrode bodies constituting the electrode body group 20, and may be, for example, one.

As shown in FIG. 3, the protrusion parts 70b are formed in a substantially U-shape in cross section. In the vertical direction Z, the protrusion parts 70b preferably protrude closer to the side of the electrode body group 20 than the surface on the side of the electrode body group 20 of the first region 51a. The protrusion parts 70b do not preferably contact the winding electrode bodies 20a, 20b, and 20c constituting the electrode body group 20. The plurality of protrusion parts 70b are preferably arranged at positions separated from the winding electrode bodies 20a, 20b, and 20c. In the vertical direction Z, a length Ha of the winding electrode body 20a is preferably smaller than a distance Hb from the lower ends of the protrusion parts 70b to the bottom wall 12a of the exterior body 12 (i.e., Ha<Hb). Thus, even if the winding electrode bodies 20a, 20b, and 20c move toward the sealing plate 14, it is possible to prevent the curvature parts 20r and the protrusion parts 70b from rubbing against each other. Accordingly, the separator 26 is not liable to be damaged, which makes it possible to effectively prevent the short circuit between the positive electrode 22 and the negative electrode 24. The shortest distance D between the protrusion parts 70b and the winding electrode bodies 20a, 20b, and 20c may be generally 0.1 mm or more.

The shortest distance D between the protrusion parts 70b and the winding electrode bodies 20a, 20b, and 20c is preferably 5 mm or less, more preferably 3 mm or less, and further more preferably 2 mm or less. Thus, it is possible to more effectively prevent the curvature parts 20r and the protrusion parts 70b from rubbing against each other. However, the protrusion parts 70b and the winding electrode bodies 20a, 20b, and 20c may contact each other in other embodiments.

Although not particularly limited, the area of a region 71 at the shortest distance D from the winding electrode body 20a in the protrusion part 70b is generally preferably 1% to 20%, more preferably 1% to 10%, and further more preferably 1% to 5% when it is assumed that the area of the winding electrode body 20a in a top view is 100%. Thus, even if the protrusion part 70b contacts the winding electrode body 20a in the insertion step that will be described later, it is possible to effectively prevent the short circuit between the positive electrode 22 and the negative electrode 24. Here, the region 71 at the shortest distance D from the winding electrode body 20a has a flat surface on the side of the winding electrode bodies 20a, 20b, and 20c. However, the region 71 may have a shape along the outside surface (upper surface) of each of the winding electrode bodies 20a, 20b, and 20c, specifically a curved shape along the curvature part 20r.

As shown in FIG. 2, the negative electrode insulating member 80 is arranged symmetrically with the positive electrode insulating member 70 with respect to a center CL in the long side direction Y of the electrode body group 20. The configuration of the negative electrode insulating member 80 may be the same as that of the positive electrode insulating member 70. Here, the negative electrode insulating member 80 has the base part 80a arranged between the sealing plate 14 and the negative electrode first collecting part 61 and the plurality of protrusion parts 80b like the positive electrode insulating member 70.

The battery 100 preferably includes both the positive electrode insulating member 70 and the negative electrode insulating member 80. Thus, even if vibration, shock, or the like is applied during the use of the battery 100, the electrode body group 20 and the sealing plate 14 are easily maintained in a parallel state (a state in FIG. 2). Further, in the insertion step that will be described later, it is possible to make the electrode body group 20 and the protrusion parts 70b contact each other more suitably (for example, in a balanced manner in the long side direction Y) and stably press the electrode body group 20 by the protrusion parts 70b to be inserted into the exterior body 12.

Manufacturing Method for Battery 100

A manufacturing method for the battery 100 is characterized by using the winding electrode bodies 20a, 20b, and 20c as described above. Other manufacturing processes may be the same as those of conventional technologies. The battery 100 may be manufactured by a manufacturing method in which the battery case 10 (the exterior body 12 and the sealing plate 14), the electrode body group 20 (the winding electrode bodies 20a, 20b, and 20c), the electrolytic solution, the positive electrode terminal 30, the negative electrode terminal 40, the positive electrode collecting part 50 (the positive electrode first collecting part 51 and the positive electrode second collecting part 52), and the negative electrode collecting part 60 (the negative electrode first collecting part 61 and the negative electrode second collecting part 62) as described above are prepared in addition to the positive electrode insulating member 70 and the negative electrode insulating member 80, and which includes, for example, a first attachment step, a second attachment step, an insertion step, and a sealing step in this order. Further, the manufacturing method disclosed here may further include other steps in arbitrary stages.

In the first attachment step, a first united object as shown in FIGS. 10 and 11 is manufactured. Specifically, the positive electrode terminal 30, the positive electrode first collecting part 51, the positive electrode insulating member 70, the negative electrode terminal 40, the negative electrode first collecting part 61, and the negative electrode insulating member 80 are first attached to the sealing plate 14.

The positive electrode terminal 30, the positive electrode first collecting part 51, and the positive electrode insulating member 70 are fixed to the sealing plate 14 by, for example, caulking work (riveting). As shown in FIG. 9, the caulking work is performed with the gasket 90 held between the outside surface of the sealing plate 14 and the positive electrode terminal 30 and also with the positive electrode insulating member 70 held between the inside surface of the sealing plate 14 and the positive electrode first collecting part 51. Note that the material of the gasket 90 may be the same as that of the positive electrode insulating member 70. Specifically, the positive electrode terminal 30 before the caulking work is inserted into a through-hole 90h of the gasket 90, the terminal withdrawing hole 18 of the sealing plate 14, the through-hole 70h of the positive electrode insulating member 70, and the through-hole 51h of the positive electrode first collecting part 51 in order from above the sealing plate 14 and caused to protrude below the sealing plate 14. Then, the portion of the positive electrode terminal 30 protruding below the sealing plate 14 is caulked so that a compressive force is applied in the vertical direction Z. Thus, a caulking part 30c is formed at the tip end (the lower end in FIG. 2) of the positive electrode terminal 30.

By such caulking work, the gasket 90, the sealing plate 14, the positive electrode insulating member 70, and the positive electrode first collecting part 51 are integrally fixed to the sealing plate 14 and the terminal withdrawing hole 18 is sealed. Note that the caulking part 30c may be welded and joined to the positive electrode first collecting part 51. Thus, it is possible to further improve conduction reliability.

The fixation between the negative electrode terminal 40, the negative electrode first collecting part 61, and the negative electrode insulating member 80 may be performed like the case of the positive electrode described above. That is, the negative electrode terminal 40 before caulking work is inserted into the through-hole of a gasket, the terminal withdrawing hole 19 of the sealing plate 14, the through-hole of the negative electrode insulating member 80, and the through-hole of the negative electrode first collecting part 61 in order from above the sealing plate 14 and caused to protrude below the sealing plate 14. Then, the portion of the negative electrode terminal 40 protruding below the sealing plate 14 is caulked so that a compressive force is applied in the vertical direction Z. Thus, a caulking part 40c is formed at the tip end (the lower end in FIG. 2) of the negative electrode terminal 40.

Next, a positive electrode outside conductive member 32 and a negative electrode outside conductive member 42 are attached to the outside surface of the sealing plate 14 via the outside insulating members 92. Note that the material of the outside insulating members 92 may be the same as that of the positive electrode insulating member 70. Further, a timing at which the positive electrode outside conductive member 32 and the negative electrode outside conductive member 42 are attached may be set after the insertion step (for example, after the solution injection hole 15 is sealed).

In the second attachment step, a second united object as shown in FIG. 5 is manufactured using the first united object manufactured in the first attachment step. Specifically, three winding electrode bodies 20a to which the positive electrode second collecting part 52 and the negative electrode second collecting part 62 are annexed as shown in FIG. 6 are first prepared and arranged side by side in the short side direction X as the winding electrode bodies 20a, 20b, and 20c. At this time, the winding electrode bodies 20a, 20b, and 20c may be arranged in parallel so that the positive electrode second collecting part 52 is arranged on one side (the left side in FIG. 5) in the long side direction Y and the negative electrode second collecting part 62 is arranged on the other side (the right side in FIG. 5) in the long side direction Y.

Next, in a state in which the plurality of positive electrode tabs 22t are curved as shown in FIG. 4, the positive electrode first collecting part 51 (specifically, the second region 51b) fixed to the sealing plate 14 and the positive electrode second collecting part 52 (specifically, the collecting plate connection part 52a) of the winding electrode bodies 20a, 20b, and 20c are joined to each other. Further, in a state in which the plurality of negative electrode tabs 24t of the negative electrode tab group 25 are curved, the negative electrode first collecting part 61 fixed to the sealing plate 14 and the negative electrode second collecting part 62 of the winding electrode bodies 20a, 20b, and 20c are joined to each other. As a joining method, welding such as ultrasonic wave welding, resistance welding, and laser welding may be used. Particularly, welding by the irradiation of high-energy rays such as laser beams is preferably used. By such welding work, a joining part is formed on each of the recessed part 52d of the positive electrode second collecting part 52 and the recessed part 62d of the negative electrode second collecting part 62.

Figure 12:
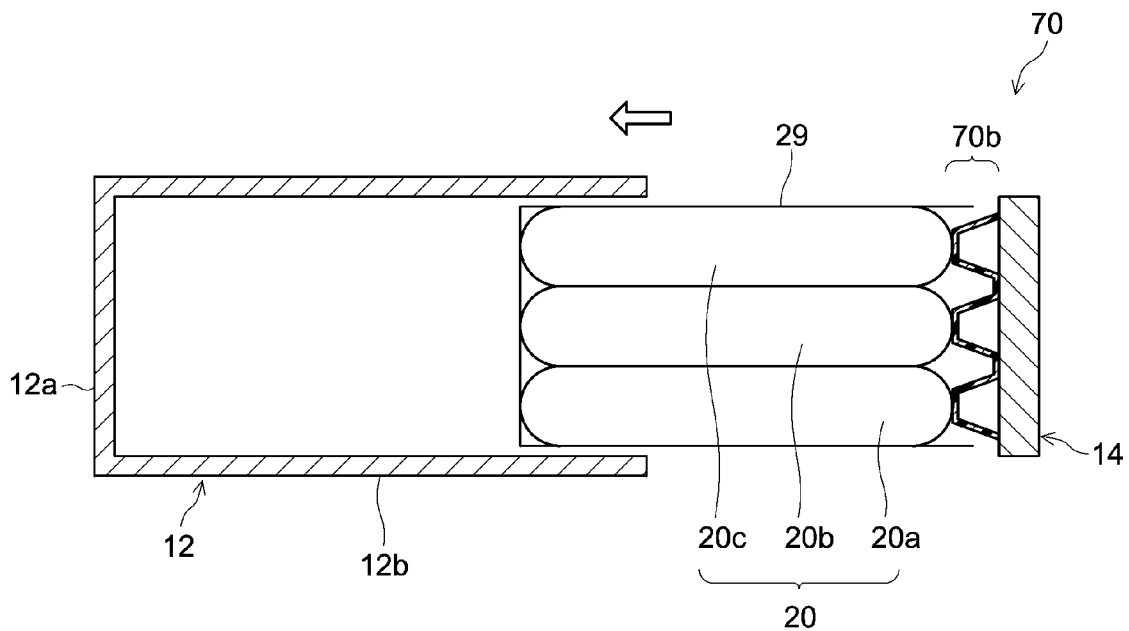
FIG. 12 is a schematic cross-sectional view for describing a battery insertion step according to an embodiment.

In the insertion step, the electrode body group 20 integrated with the sealing plate 14 is accommodated in the inside space of the exterior body 12. FIG. 12 is a schematic cross-sectional view for describing the insertion step. Specifically, an insulative resin sheet made of a resin material such as polyethylene (PE) is, for example, first folded in a bag shape or a box shape to prepare the electrode body holder 29. Next, the electrode body group 20 is accommodated in the electrode body holder 29. Then, the electrode body group 20 covered with the electrode body holder 29 is inserted into the exterior body 12. When the weight of the electrode body group 20 is heavy, i.e., when the electrode body group 20 generally weighs 1 kg or more, weighs, for example, 1.5 kg or more, or weighs 2 kg to 3 kg, the electrode body group 20 may be inserted into the exterior body 12 (with the exterior body 12 turned sideways) so that the long side walls 12b of the exterior body 12 cross a gravity direction as shown in FIG. 12.

Each of the curvature parts 20r of the winding electrode bodies 20a, 20b, and 20c constituting the electrode body group 20 is pressed by the protrusion parts 70b of the positive electrode insulating member 70 and/or the protrusion parts 80b of the negative electrode insulating member 80 that serve as spacers and pressed into the exterior body 12. By pressing the electrode body group 20 by the protrusion parts 70b and/or the protrusion parts 80b, it is possible to reduce loads on the positive electrode tab group 23 and/or the negative electrode tab group 25. When the electrode body group 20 is attached to the exterior body 12, the protrusion parts 70b and/or the protrusion parts 80b that serve as spacers can function as buffering members that reduce loads on the positive electrode tab group 23 and/or the negative electrode tab group 25.

At this time, the protrusion parts 70b and/or the protrusion parts 80b preferably thrust the winding electrode bodies 20a, 20b, and 20c in a state of getting in the curvature parts 20r on one side of the winding electrode bodies 20a, 20b, and 20c. Thus, it is possible to make the positive electrode insulating member 70 and/or the negative electrode insulating member 80 tightly contact the winding electrode bodies 20a, 20b, and 20c and prevent the positive electrode insulating member 70 and/or the negative electrode insulating member 80 from sliding against the winding electrode bodies 20a, 20b, and 20c. As a result of thrusting the winding electrode bodies 20a, 20b, and 20c in this manner, the recessed parts 20d are formed at the portions of the winding electrode bodies 20a, 20b, and 20c that face the protrusion parts 70b and/or the protrusion parts 80b.

The positive electrode tab group 23 and/or the negative electrode tab group 25 have play so as to be movable in a direction crossing their protruding direction. Therefore, when the exterior body 12 is raised so as to make the sealing plate 14 positioned on an upper side after the electrode body group 20 is inserted into the exterior body 12, the electrode body group 20 slightly moves downward due to its own weight. Thus, as shown in FIG. 3, the protrusion parts 70b of the positive electrode insulating member 70 and the winding electrode bodies 20a, 20b, and 20c are arranged at separated positions. Further, the protrusion parts 80b of the negative electrode insulating member 80 and the winding electrode bodies 20a, 20b, and 20c are arranged at separated positions.

In the sealing step, the sealing plate 14 is joined to the edge part of the opening 12h of the exterior body 12 to seal the opening 12h. The joining of the sealing plate 14 may be performed by, for example, welding such as laser welding. After that, an electrolytic solution is injected from the solution injection hole 15, and the solution injection hole 15 is sealed by the sealing member 16 to tightly close the battery 100.

In the manner described above, it is possible to manufacture the battery 100.

The battery 100 is available for various applications but may be suitably used in an application in which an external force such as vibration and shock can be applied during use. For example, the battery 100 may be suitably used as a power source (driving power) for a motor mounted in a mobile body (typically, a vehicle such as an automobile and a truck). The type of the vehicle is not particularly limited but examples of the vehicle include a plug-in hybrid vehicle (PHV), a hybrid vehicle (HV), and an electric vehicle (EV). The battery 100 may be suitably used as a battery pack in which a plurality of the batteries 100 are arranged in a prescribed array direction and a load is added by a constraint mechanism in the array direction. Even in a state in which a load is added by the constraint mechanism, the protrusion parts 70b of the positive electrode insulating member 70 and/or the protrusion parts 80b of the negative electrode insulating member 80, and the winding electrode bodies 20a, 20b, and 20c do not preferably contact each other.

Some embodiments of the present invention are described above, but the above embodiments are given only as an example. The present invention may be carried out in various other modes. The present invention may be carried out on the basis of the contents disclosed in the present specification and the technological common knowledge in the field concerned. Technologies described in claims include those obtained by modifying the above exemplified embodiments in various ways. For example, it is possible to replace some of the above embodiments with other modified modes or add other modified modes to the above embodiments. Further, it is also possible to appropriately delete technological features so long as the technological features are not described as being essential.

For example, in the above embodiments, the winding terminal 24e of the negative electrode 24 is arranged at the curvature part 20r of the winding electrode body 20a. However, the winding terminal 24e of the negative electrode 24 may be arranged at other places. The winding terminal 24e of the negative electrode 24 may be arranged at the flat part 20f. With such a configuration, the shape of the outside surface of the curvature part 20r is secured. Thus, a gap is not liable to be generated between the vicinity of the winding terminal 22e of the positive electrode 22 and the facing negative electrode 24 in the curvature part 20r. As a result, it is possible to prevent the slight short circuit or the like between the positive electrode and the negative electrode caused by the precipitation of metal lithium (dendrite).

For example, in the above embodiments, the positive electrode insulating member 70 includes the plurality of protrusion parts 70b, and each of the protrusion parts 70b has a substantially U-shaped cross section. However, the number of the protrusion parts 70b may be one. Further, the protrusion parts 70b may have an arbitrary shape. The protrusion parts 70b may have, for example, a rectangular cross section. The protrusion parts 70b may have a rectangular part having a rectangular shape and one or a plurality of protrusion rib parts protruding to the side of the winding electrode bodies 20a, 20b, and 20c from the rectangular part. The protrusion parts 70b may have a square-shaped or U-shaped cross section.

What is claimed is:

1. A battery comprising:
   an exterior body having a bottom wall, a pair of first side walls extending from the bottom wall, a pair of second side walls extending from the bottom wall, and an opening defined by the bottom wall, the pair of first side walls and the pair of second side walls;
   a sealing plate that seals the opening of the exterior body;
   at least one winding electrode body in which a strip-shaped positive electrode and a strip-shaped negative electrode are laminated with each other and wound about a winding axis;
   a strip-shaped separator between the positive electrode and the negative electrode;
   a positive electrode tab group that includes a plurality of positive electrode tabs provided at an end in a winding axis direction of the winding electrode body and is electrically connected to the positive electrode; and
   a negative electrode tab group that includes a plurality of negative electrode tabs provided at an end in the winding axis direction of the winding electrode body and is electrically connected to the negative electrode, wherein
   the winding electrode body has a flat shape having a pair of curvature parts having a curved outside surface and a flat part that connects the pair of curvature parts to each other and has a flat outside surface and is accommodated in the exterior body so that one of the curvature parts is adjacent to the sealing plate and the other thereof is adjacent to the bottom wall of the exterior body,
   a winding terminal of the separator is at the flat part, and
   wherein, when a line perpendicular to the winding axis of the winding electrode body and perpendicular to the bottom wall is defined as L1, the separator is between a portion positioned at an outermost periphery of the negative electrode in at least one of the pair of the curvature parts and a portion positioned on a winding inner peripheral side of the negative electrode, and a space between the portion positioned at the outermost periphery of the negative electrode and the portion positioned on the winding inner peripheral side of the negative electrode is free of the positive electrode along the line L1.

2. The battery according to claim 1, comprising:
   a spacer arranged between the sealing plate and the winding electrode body, wherein the spacer is adjacent to the wound electrode body.

3. The battery according to claim 2, comprising:
   a terminal that is attached to the sealing plate and electrically connected to the positive electrode tab group or the negative electrode tab group;
   a collecting part that electrically connects the positive electrode tab group or the negative electrode tab group and the terminal to each other; and an insulating member that insulates the sealing plate and the collecting part from each other and has a protrusion part protruding to a side of the winding electrode body from a side of the sealing plate, wherein the protrusion part of the insulating member constitutes the spacer.

4. The battery according to claim 2, wherein the spacer does not contact the winding electrode body.

5. The battery according to claim 1, wherein the at least one winding electrode body includes a plurality of winding electrode bodies.

6. The battery according to claim 1, wherein
the separator includes a resinous base material part and a heat resistance layer that is provided on the base material part and contains an inorganic filler, and
the outside surface of the winding electrode body is covered with the heat resistance layer in at least one of the pair of curvature parts.

7. A manufacturing method for a battery including
an exterior body having a bottom wall, a pair of first side walls extending from the bottom wall, a pair of second side walls extending from the bottom wall, and an opening defined by the bottom wall the pair of first side walls and the pair of second side walls,
a sealing plate that seals the opening of the exterior body,
at least one winding electrode body in which a strip-shaped positive electrode and a strip-shaped negative electrode are laminated with each other and wound about a winding axis,
a strip-shaped separator between the positive electrode and the negative electrode,
a positive electrode tab group that includes a plurality of positive electrode tabs provided at an end in a winding axis direction of the winding electrode body and is electrically connected to the positive electrode,
a negative electrode tab group that includes a plurality of negative electrode tabs provided at an end in the winding axis direction of the winding electrode body and is electrically connected to the negative electrode, and
a spacer arranged between the sealing plate and the winding electrode body,
the winding electrode body having a flat shape having a pair of curvature parts having a curved outside surface and a flat part that connects the pair of curvature parts to each other and has a flat outside surface and being accommodated in the exterior body so that one of the curvature parts is adjacent to the sealing plate and the other thereof is adjacent to the bottom wall of the exterior body,
a winding terminal of the separator is at the flat part, the manufacturing method comprising:

an insertion step of thrusting the winding electrode body into the exterior body with the spacer; and
a sealing step of sealing the opening of the exterior body with the sealing plate, wherein,
in the insertion step, an area between a portion positioned at an outermost periphery of the negative electrode in at least a part of a region pressed by the spacer in the winding electrode body and a portion positioned on a winding inner peripheral side of the negative electrode includes the separator and is free of the positive electrode.

8. The manufacturing method for the battery according to claim 7, wherein, when a line perpendicular to the winding axis of the winding electrode body and perpendicular to the bottom wall is defined as L1, at least an outside surface positioned on the line L1 in the winding electrode body is pressed in the insertion step.

9. The manufacturing method for the battery according to claim 7, wherein the spacer does not contact the winding electrode body after the sealing step.

10. The manufacturing method for the battery according to claim 7, wherein a shortest distance between the winding electrode body and the spacer is 5 mm or less after the sealing step.

11. The battery according to claim 1, comprising:
a spacer between the sealing plate and the winding electrode body, wherein the spacer is adjacent to the wound electrode body,
the separator is between the portion positioned at the outermost periphery of the negative electrode in a curvature part adjacent to the spacer and the portion positioned on the winding inner peripheral side of the negative electrode, and the space between the portion positioned at the outermost periphery of the negative electrode and the portion positioned on the winding inner peripheral side of the negative electrode is free of the positive electrode along the line L1.

12. The battery according to claim 2, wherein in a direction perpendicular to the winding axis of the winding electrode body, a width W2 of the at least one winding electrode body is greater than a width W1 of the spacer.

13. The battery according to claim 12, wherein the at least one winding electrode body includes a plurality of winding electrode bodies, and the width W2 is the total width of the plurality of winding electrode bodies.

14. The battery according to claim 1, wherein a fastening tape is attached to the winding terminal of the separator, and the fastening tape is arranged at the flat part so that its whole area does not put on the curvature part.

* * * * *